United States Patent [19]
Shouji et al.

[11] Patent Number: 5,809,636
[45] Date of Patent: Sep. 22, 1998

[54] METHOD OF MAKING A MAGNETORESISTIVE THIN FILM MAGNETIC HEAD WITH SPECIFIC SHAPES OF LEADS

[75] Inventors: Shigeru Shouji; Atsushi Toyoda, both of Hamamatsu, Japan

[73] Assignee: Yamaha Corporation, Shizuoka, Japan

[21] Appl. No.: 861,422

[22] Filed: May 21, 1997

[30] Foreign Application Priority Data

May 23, 1996 [JP] Japan .................................. 8-151767

[51] Int. Cl.⁶ ............................................ H01F 7/06
[52] U.S. Cl. .................................. 29/603.14; 360/113
[58] Field of Search ........................... 29/603.13, 603.14, 29/603.15, 603.16, 603.18; 360/113, 121

[56] References Cited

U.S. PATENT DOCUMENTS

| | | | |
|---|---|---|---|
| 3,908,194 | 9/1975 | Romankiw | 360/113 |
| 3,975,772 | 8/1976 | Lin | 360/113 |
| 5,465,186 | 11/1995 | Bajorek et al. | 360/113 |
| 5,722,157 | 3/1998 | Shouji et al. | 29/603.14 |

*Primary Examiner*—Carl E. Hall
*Assistant Examiner*—Christopher Goins
*Attorney, Agent, or Firm*—Ostrolenk, Faber, Gerb & Soffen, LLP

[57] ABSTRACT

A lower shield has an area smaller than an upper shield. A lead is constituted of a thin lead portion and a thick lead portion, the thin lead portion being formed in a reproduction gap between the upper and lower magnetic shield layers and the thick lead portion being formed spaced apart from the end of the lower magnetic shield layer in the depth direction and extending downward in the thickness direction at a level lower than the thin lead portion. The upper surface of the lead is not formed with a step. The thin and thick lead portions are connected via a contact hole formed through a lower reproduction gap layer.

17 Claims, 8 Drawing Sheets

METHOD OF MAKING A MAGNETORESISTIVE THIN FILM MAGNETIC HEAD WITH SPECIFIC SHAPES OF LEADS

This application is based on Japanese Patent Application No. 8-151767, filed on May 23, 1996, the entire contents of which are incorporated herein by reference. Also contents of U.S. patent application Ser. No. 08/580296, filed on Dec. 28, 1995, and U.S. CIP patent application of the U.S. Ser. No. 08/580296, filed on Mar. 20, 1997, are incorporated herein by reference.

BACKGROUND OF THE INVENTION a) Field of the Invention

The present invention relates to a magnetic head of a hard disk drive or the like and its manufacture method. More particularly, the invention relates to a magnetoresistive type thin film magnetic head of a magnetic shield type and its manufacture method capable of lowering the resistance of a lead to suppress heat generation and prevent insufficient insulation of an upper magnetic shield layer to thereby improve manufacture yield. A magnetoresistive type thin film magnetic head is hereinafter called an "MR type magnetic head" and includes a giant magnetoresistive (GMR) type thin film magnetic head.

b) Description of the Related Art

An MR type magnetic head is used for only reproduction of information recorded in a magnetic recording medium by detecting a magnetic field generated from magnetic poles of a magnetic recording medium. As compared to reproduction by an induction type magnetic head, the track density and a line record density can be made higher. An induction type magnetic head for recording is combined with an MR type magnetic head to form an induction type and magnetoresistive type composite magnetic head (hereinafter called an "induction type and MR type composite magnetic head").

FIG. 2 shows the structure of an MR type magnetic head (with an upper reproduction gap layer and an upper magnetic shield layer being removed) of a conventional induction type and MR type composite magnetic head used for hard disks. An MR magnetic head 10 is formed on a slider substrate 12 made of $Al_2O_3$—TiC or the like by sequentially laminating a protective layer 14 made of non-magnetic insulating material such as $Al_2O_3$, a lower magnetic shield layer 16 made of soft magnetic material such as NiFe alloy, and a lower reproduction gap layer 18 made of non-magnetic insulating material such as $Al_2O_3$. On the reproduction gap layer 18, right and left leads (electrodes) 20, 20 are formed. An MR element 11 is connected between the leads 20, 20. The tip surface of the MR element 22 forms a recording medium facing surface (ABS:air bearing surface). The MR element 22 is made of a lamination of an MR film, a spacer, a transverse bias film, and the like. Each lead 20 is made of a lamination of a magnetic material layer (magnet layer) 26 for enhancing uniaxial anisotropy of the MR film to suppress Barkhausen noises (longitudinal bias layer) and an electrically conductive film 28 for lowering the electrical resistance of the lead 20.

In the structure shown in FIG. 2, the tip surface or ABS of the lead requires some mechanical strength and corrosion resistance because it is subject to a lapping process. Generally, the magnet film 26 is made of Co-containing alloy, and the electrically conductive film 28 is made of Ta or the like. These lead materials have a relatively high resistivity so that when a sense current flows through the MR element 22, heat generation becomes large and electromigration may be accelerated which is one cause of lowering the reliability of the magnetic head and considerably shortening the lifetime thereof. Electromigration is a phenomenon in which when a sense current flows at a high temperature, metal atoms are liberated and moved to increase the resistance of the leads.

In order to lower the resistance of leads, another structure has been proposed as shown in FIG. 3. In this structure, contact leads 30, 30 made of the same materials as the leads shown in FIG. 2 are formed only at regions near the ABS 24. Relatively thick main bulk electrodes 32, 32 made of material having a relatively low resistivity are formed in contact with and at the back of the contact leads along the depth direction of the MR element. Leads 34, 34 are constituted of these contact leads 30, 30 and main leads 32, 32.

An MR type magnetic head of a magnetic shield type (a magnetic shield type MR head) has an upper reproduction gap layer covering the MR element and leads, this gap layer being made of non-magnetic material such as $Al_2O_3$. On this upper reproduction gap layer, an upper magnetic shield layer is formed being made of conductive and magnetic shield material. The upper magnetic shield layer is made of soft magnetic material such as NiFe alloy same as the lower magnetic shield layer. With the structure shown in FIG. 3, a large step 36 is formed on the lead 34 so that the upper reproduction gap layer cannot be formed to have a predetermined thickness at this step 36. It is therefore difficult to provide perfect electrical insulation between the lead 34 and the upper magnetic shield layer, and manufacture yield is caused to be lowered.

SUMMARY OF THE INVENTION

It is an object of the present invention to lower the electrical resistance of leads of a magnetic head and prevent insufficient insulation between the leads and upper magnetic shield layers to thereby improve manufacture yield.

According to one aspect of the present invention, there is provided a magnetic head comprising: a) a substrate; b) a first magnetic shield layer formed on the substrate and having a first length along a depth direction of the magnetic head; c) a first lead portion formed on the substrate and having a first thickness and a first resistivity, wherein the first lead portion is located at a back side along the depth direction with respect to a magnetic medium, wherein the first lead portion and the first magnetic shield layer are coplanar; d) a flat first gap layer formed over the first magnetic shield layer and the first lead portion, wherein the flat first gap layer has a contact hole therethrough so as to expose a part of the first lead portion; e) a second lead portion formed on the first gap layer and located at a front side along the depth direction with respect to the magnetic medium and contacting the first lead portion through the contact hole; and f) a magnetoresistive material layer formed over the second lead portion.

The first lead portion is located at the back side along the depth direction and formed thick extending lower than the second lead portion in the thickness direction. Accordingly, the resistance of the lead can be reduced and heat generation can be suppressed. Since the first lead portion extends lower than the second lead portion, even if it is made thick, the step of the upper surface of the lead can be minimized. Therefore, since an upper magnetic shield layer is formed on an upper reproduction gap layer formed on the flat upper surface of the lead, insulation between the lead and the upper shield layer can be maintained in good conditions.

According to another aspect of the present invention, there is provided a method of fabricating a magnetic head comprising the steps of: a) providing a substrate having a first magnetic shield layer having a first length from an edge of the substrate adapted to face against a magnetic medium along a depth direction of the magnetic head; b) forming a first lead portion having a first thickness and a first resistivity on the substrate, wherein the first lead portion locating at a back side of the first magnetic shield layer along the depth direction with respect to the magnetic medium, and the first lead portion and the first magnetic shield layer are coplanar; c) forming a first gap layer over the first magnetic shield layer and the first lead portion; d) forming a contact hole through the first gap layer so as to expose a part of the first lead portion; e) forming a second lead portion having a second thickness and a second resistivity on the first gap layer, locating at a front side along the depth direction with respect to the magnetic medium, starting from a position above the edge, and contacting the first lead portion through the contact hole; and f) forming a magnetoresistive material layer over the second lead portion.

The resistance of the lead can be lowered and heat generation can be suppressed. Therefore, the reliability of the magnetic head can be improved. Insulation between the lead and the upper magnetic shield layer can be maintained in good conditions, and manufacture yield can be improved.

DETAILED DESCRIPTION OF THE PREFERRED EMBODIMENTS

Figure 1:
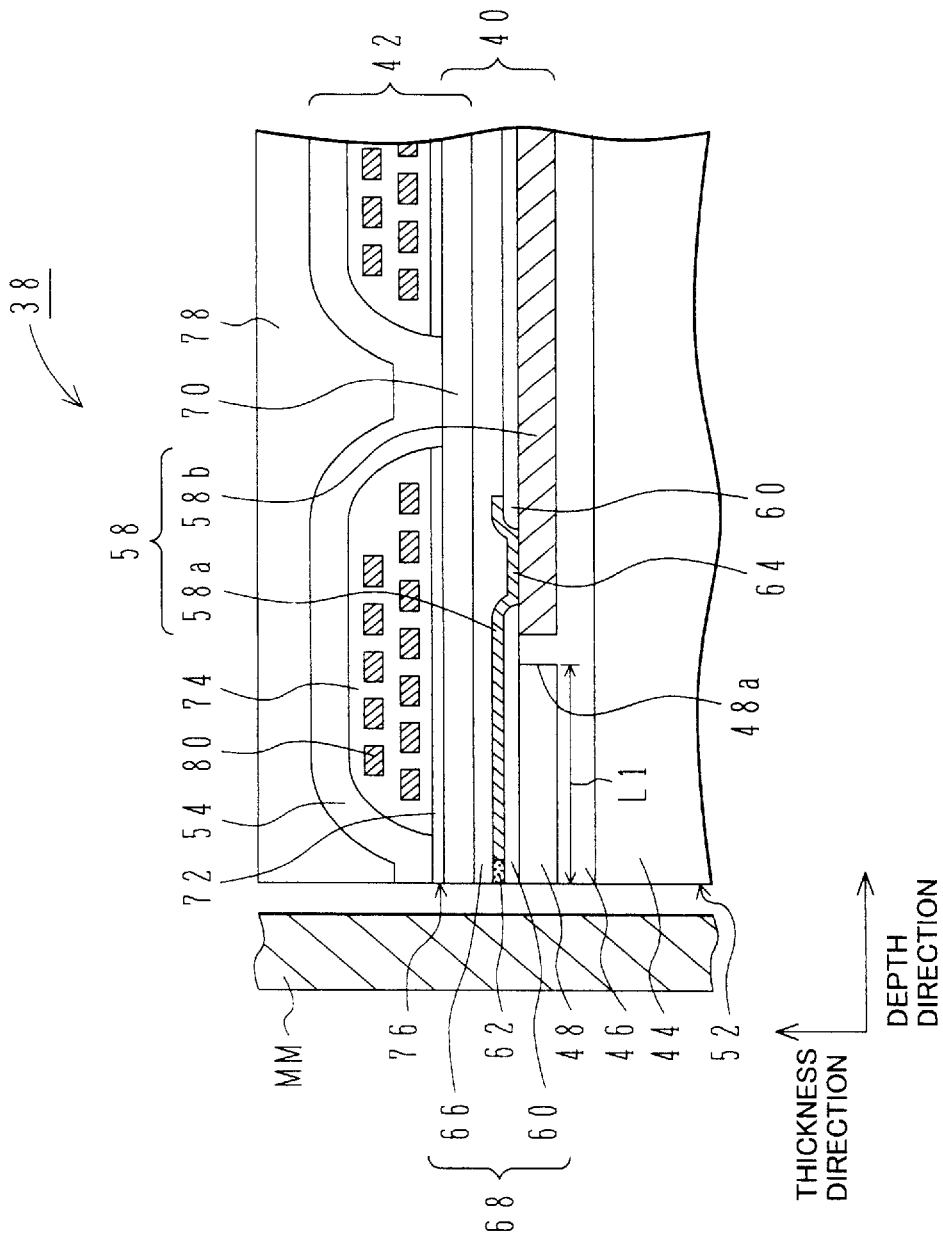
FIG. 1 is a cross sectional view of an induction type and MR type composite magnetic head according to an embodiment of the invention.

Embodiments of the invention will be described with reference to the accompanying drawings. FIG. 1 is a cross sectional view showing the structure of an induction type and MR type composite magnetic head for hard disk drives according to an embodiment of the invention. This induction type and MR type composite magnetic head 38 has an MR type magnetic head 40 and an induction type magnetic head 42 stacked upon the head 40. Both heads 40 and 42 are thin film magnetic heads fabricated by thin film forming techniques.

The magnetic head 38 performs data recording and reproducing of a magnetic recording medium MM which faces a recording medium facing surface (air bearing surface:ABS) 52 of the magnetic head 38. The directions of the magnetic head 38 are defined as in the following. A depth direction is a direction (horizontal direction in FIG. 1) generally perpendicular to the surface of the magnetic recording medium MM. A width direction is a direction (a direction extending from the front to the back of the drawing sheet of FIG. 1) generally parallel to the surface of the magnetic recording medium MM and to the surface of a substrate 44. A thickness direction is a direction (vertical direction in FIG. 1) generally parallel to the surface of the magnetic recording medium MM and generally perpendicular to the surface of the substrate. A thickness is defined by a distance along the thickness direction.

The slider substrate 44 made of $Al_2O_3$—TiC or the like of the MR type magnetic head 40 has thereon a non-magnetic insulating film (protective film) 46 made of $Al_2O_3$ on which a lower magnetic shield layer 48 made of soft magnetic material such as NiFe alloy is stacked. The lower magnetic shield layer 48 is formed in an area smaller than an upper magnetic shield layer 70. The length L1 of the lower magnetic shield layer 48 along the depth direction from a recording medium facing surface (ABS) 52 is shorter than that of the upper magnetic shield and lower core layer 70 along the depth direction. The tip surface of the lower shield layer 48 exposes at the recording medium facing surface 52.

The lower magnetic shield layer 48 is not necessarily required to be shorter than the upper magnetic shield and lower core layer 70 along the depth direction. The function of magnetic shield of the lower magnetic shield layer 48 becomes sufficient if it has a length along the depth direction 5 to 10 times that of the MR element in the depth direction. A thick lead portion 58b is formed at the area apart from the lower magnetic shield layer 48 along the depth direction. If the thick lead portion 58b can be formed at such an area, the lower magnetic shield layer 48 may be made more longer.

At the area apart from the rear end 48a of the lower magnetic shield layer 48, the thick lead portion 58b (main electrode) of the lead 58 is formed to a height generally flush with the lower magnetic shield layer 48, being electrically separated by the lower magnetic shield layer 48. The lower magnetic shield layer 48 is generally coplanar to the thick lead portion 58b. The thick lead portion 58b extends to a contact position to an external lead, and has a bonding pad formed at the contact position. The thick lead portion 58a is made of conductive material, for example, Ta. The thickness of a thin lead portion 58a is 0.1 to 0.4 $\mu$m which is about one tenth the thickness (1.0 to 3.5 $\mu$m) of the thick lead portion 58b. Mechanical strength and corrosion resistance of the thick lead portion 58b are not so much required because it does not expose at the recording medium facing surface 52. Therefore, metal having a high conductivity such as Cu can be used. If the highest priority is given to the manufacture simplicity, the thick lead portion 58b may be formed at the same time when the lower magnetic shield layer 48 is formed by using the magnetic material such as NiFe alloy same as the lower magnetic shield layer 48. Although the magnetic material such as NiFe alloy has generally a higher resistivity than metal such as Ta, or Cu if the thick lead portion 58b is formed sufficiently thick, the electrical resistance can be lowered more than the lead 20 shown in FIG. 2.

A pair of thick lead portions 58b is formed at the back of the MR element 62 on both sides thereof. The non-magnetic insulating film 46 such as $Al_2O_3$ fills the area surrounding the lower magnetic shield layer 48 and right and left thick lead portions 58b. Therefore, steps at the peripheries of the lower magnetic shield layer 48 and thick lead portions 58b are removed. The upper surfaces of the lower magnetic shield layer 48 and thick lead portions 58b are made generally flush with the upper surface of the non-magnetic insulating film 46.

A lower reproduction gap layer 60 made of non-magnetic insulating material such as $Al_2O_3$ is formed flat on the lower magnetic shield layer 48, thick lead portions 58b, and surrounding non-magnetic insulating film 46. On the reproduction gap layer 60, an MR element 62 is formed with its tip surface exposing at the recording medium facing surface 52. The MR element 62 is a lamination of an MR film, a spacer, a transverse bias film, and the like. The transverse bias film may be a soft adjacent layer (SAL). The right and left sides of the MR element 62 along the depth direction are connected to the thin lead portions 58a (contact leads) of the leads 58. The thin lead portion 58a is a lamination of a longitudinal bias film for enhancing the uniaxial anisotropy of the MR film to suppress Barkhausen noises and a conductive film made of Ta or the like for increasing the conductivity. The longitudinal bias film may be a magnet film. The thin lead portion 58a is connected to the thick lead portion 58b via a hole (contact hole) 64 formed through the lower reproduction gap layer 60.

An upper reproduction gap layer 66 made of non-magnetic insulating material such as $Al_2O_3$ is formed on the MR element 62 and thin lead portions 58a and on the area not formed with the thin lead portions 58a. The front edges of the upper and lower reproduction gap layers 60 and 66 constitute a reproduction gap 68 at the recording medium facing surface 52. Formed on the upper reproduction gap layer 66 is an upper magnetic shield layer 70 made of soft magnetic material such as NiFe alloy. The upper and lower magnetic shield layers 48 and 70 sandwiching the MR element 62 prevent the MR element from being affected by external magnetic interference.

The induction type magnetic head 42 uses the upper magnetic shield layer 70 of the MR type magnetic head 40 as its lower core on which a write gap layer 72, a coil 80, an insulating layer 74, and an upper core 54 are sequentially laminated. The write gap layer 72 forms a write gap 76 at the recording medium facing surface 52. The upper core 54 is covered with a protective film 78.

For data recording by the induction type and MR type composite magnetic head 38 shown in FIG. 1, a record current is made to flow through the coil 80 of the induction magnetic head 42 to generate a write magnetic field across the write gap 76 positioned between the upper and lower cores 54 and 70. This magnetic field writes data in the recording medium MM. For data reproducing, a sense current is made to flow through the MR element 62 via the leads 58 of the MR type magnetic head 40. While the current is made to flow, the track of the recording medium MM is traced so that a voltage across the MR element is modulated by data stored in the track. This modulated voltage is detected to reproduce the data.

In the structure shown in FIG. 1, the lead 58 has the thick lead portion 58b, which has generally a low resistance, from a position apart from the end 48a of the lower magnetic shield layer 48 along the depth direction to a bonding pad position or its nearby position. Being formed between the reproduction gap layers 66 and 60 between the upper and lower magnetic shield layers 70 and 48, the thin lead portions 58a, which has generally a high resistance, have a short distance along the depth direction so that the total electrical resistance of the lead 58 can be reduced. Heat generation by the sense current, which promotes electromigration of the MR element 62, is therefore reduced so that it is possible to suppress electromigration of the MR element 62, to improve the reliability of the magnetic head, and to prolong the lifetime. Since the thick lead portion 58b extends toward the height level lower than the thick lead portion, the upper surface of the lead 58 is generally flat and gives no step. As a result, the upper reproduction gap layer 66 can be formed uniformly thick and flat on the lead 58 so that the upper magnetic shield and lower core layer 70 and the lead 58 can have good insulation therebetween and the manufacture yield can be improved.

Next, an example of manufacture processes of the induction type and MR type composite magnetic head 38 shown in FIG. 1 will be described with reference to FIGS. 4 to 14. In this example, the thick lead portions 58b and the lower magnetic shield layer 48 are formed at the same time by using the same material.

Figure 4:
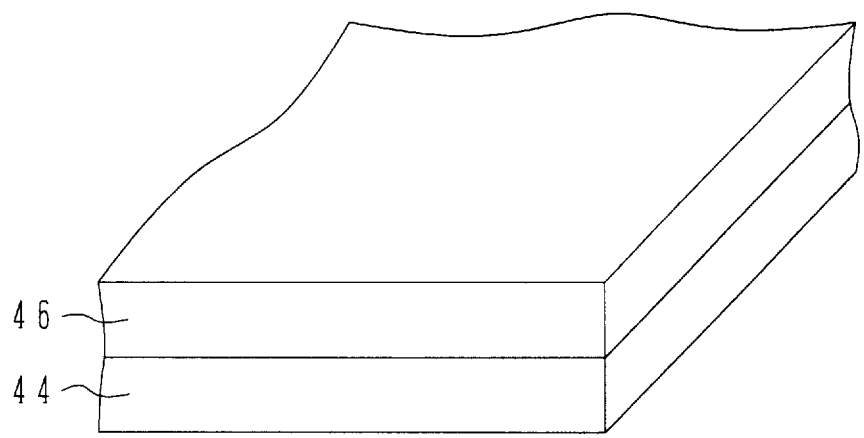
FIGS. 4 to 14 are perspective views of a substrate illustrating main processes of a method of manufacturing an MR type magnetic head according to an embodiment of the invention.

Referring to FIG. 4, a non-magnetic insulating film (protective film) 46 made of non-magnetic material such as $Al_2O_3$ is formed on the whole surface of a substrate 44 made of $Al_2O_3$—TiC or the like by sputtering, vapor deposition, or the like.

Figure 5:
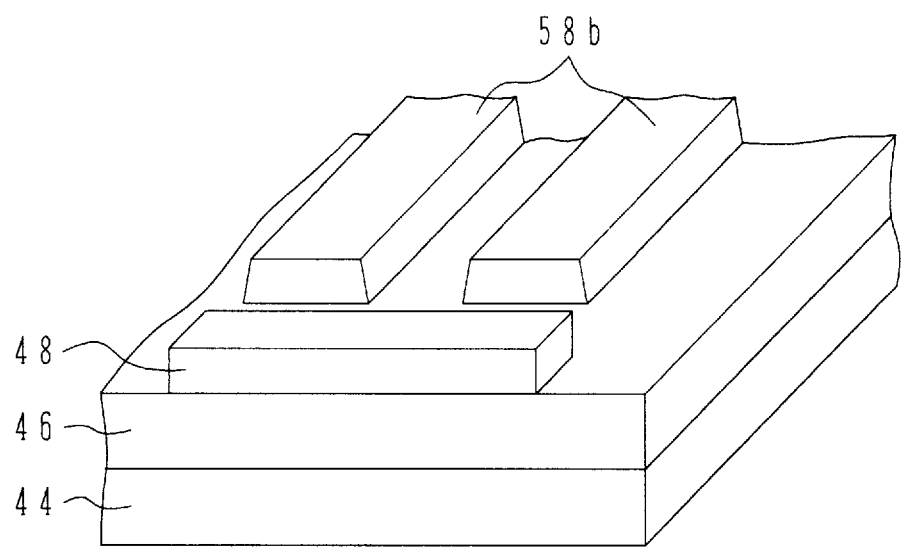

Referring to FIG. 5, formed on the non-magnetic insulating film 46 are a lower magnetic shield layer 48 and right and left thick lead portions 58b and 58b. In particular, an underlying metal layer or seed's layer used for electric plating is formed on the whole surface of the non-magnetic insulating film 46 by sputtering or the like. Thereafter, a resist frame (mask) is formed by photolithography on the surface area excepting the area where the lower magnetic shield layer 48 and thick lead portions 58b and 58b are formed on the non-magnetic insulating film 46, having the same thickness and being electrically insulated.

Figure 6:
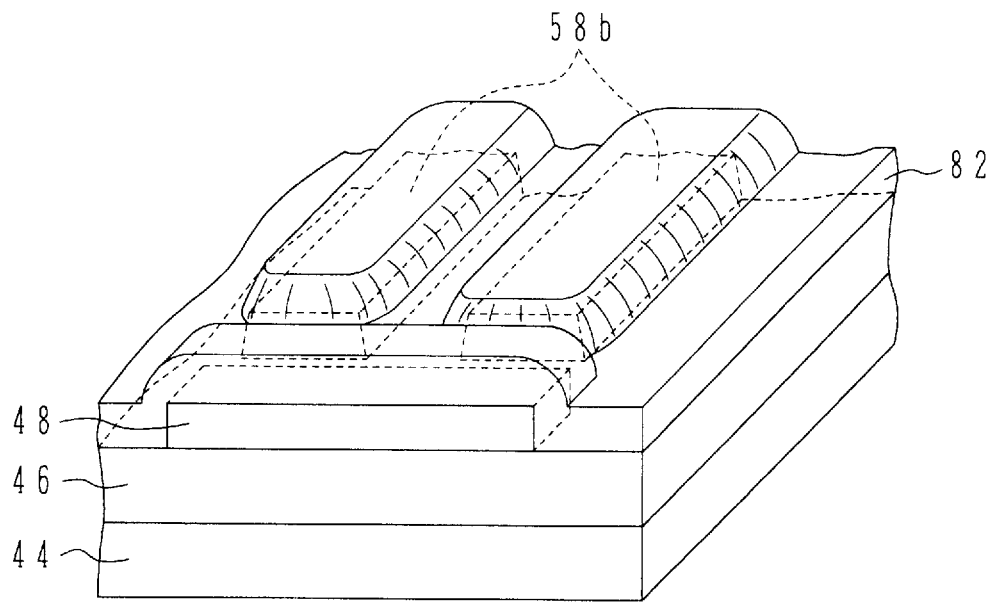

Referring to FIG. 6, non-magnetic insulating material 82 such as $Al_2O_3$ is deposited on the whole surface of the substrate thicker than the thickness of the lower magnetic shield layer 48 by 1 to 3 μm. The non-magnetic material is deposited, for example, to a thickness of 2.5 to 7.0 μm.

Figure 7:
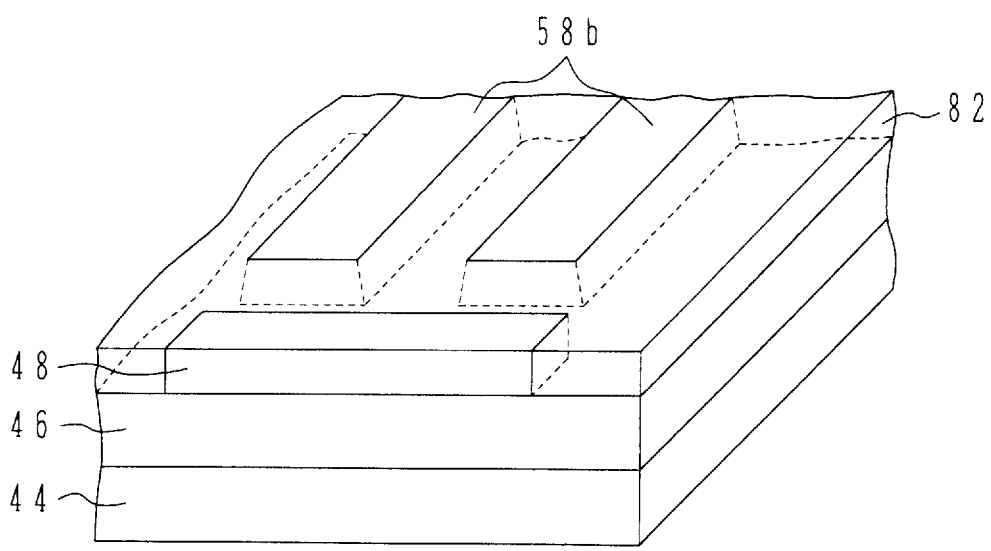

Referring to FIG. 7, the whole surface of the substrate is removed to expose the surfaces of the lower magnetic shield layer 48 and thick lead portions 58b. In particular, the lower magnetic shield layer 48 and thick lead portions 58b are lapped to a thickness of 1 to 3.5 μm. The upper surfaces of the lower magnetic shield layer 48 and thick lead portions 58b become coplanar to each other, being embedded in the non-magnetic insulating material 82 with the upper surfaces being exposed. The thick lead portions 58b are positioned at the deeper area than an MR element 62 to be later formed.

Figure 8:
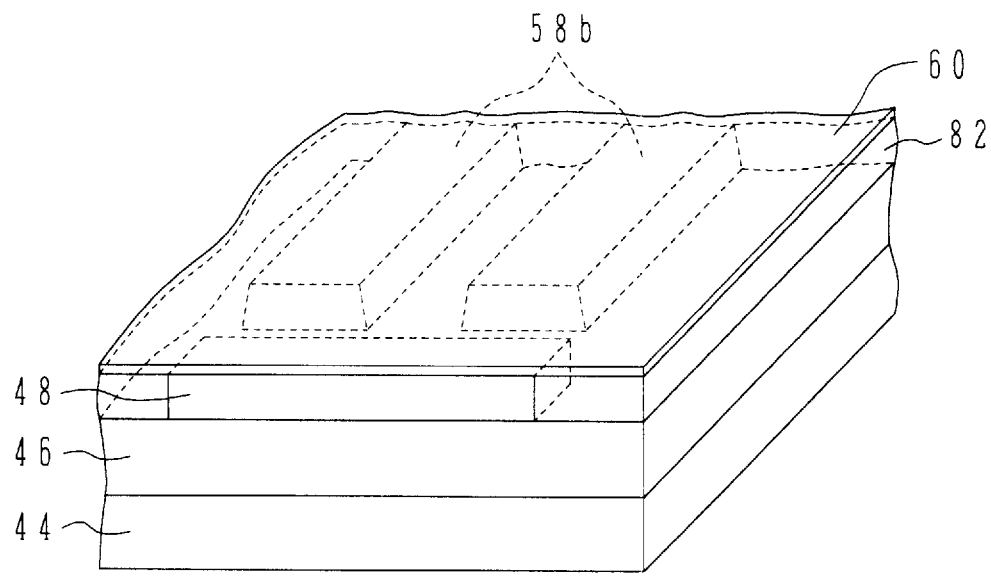

Referring to FIG. 8, a lower reproduction gap layer is deposited through sputtering or the like to a thickness of several tens to several hundreds nm over the whole surface of the substrate planarized by lapping. The upper surface of the lower reproduction gap layer 60 is also flat because the upper surfaces of the lower magnetic shield layer 48, thick lead portions 58b, and non-magnetic insulating material 82 are planarized to be coplanar to each other.

Figure 9:
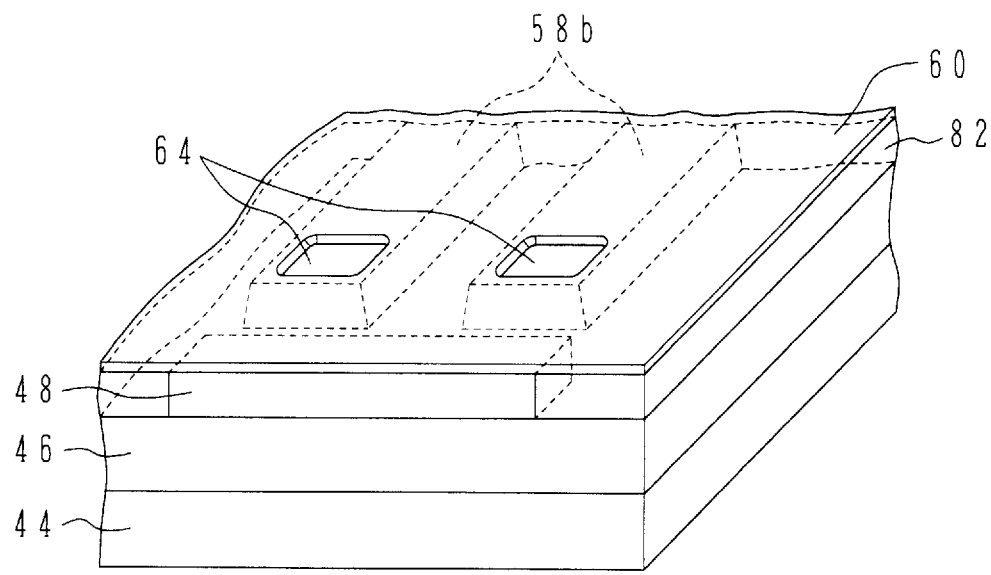

Referring to FIG. 9, a contact hole 64 is formed through the lower reproduction gap layer 60 at the position corresponding to the front area (on the recording medium facing surface side) of the thick lead portion 58b. The thick lead portion 58b therefore exposes in this contact hole 64. In particular, a photoresist frame is formed through photolithography on the lower reproduction gap layer 60 at the area excepting the area where the contact hole is formed. The whole surface of the substrate is then removed by ion milling or the like to etch the lower reproduction gap layer 60 exposed in an opening of the photoresist frame and expose the surface of the thick lead portion 58b. Thereafter, the resist frame is removed. In this manner, the contact holes 64 are formed.

Figure 10:
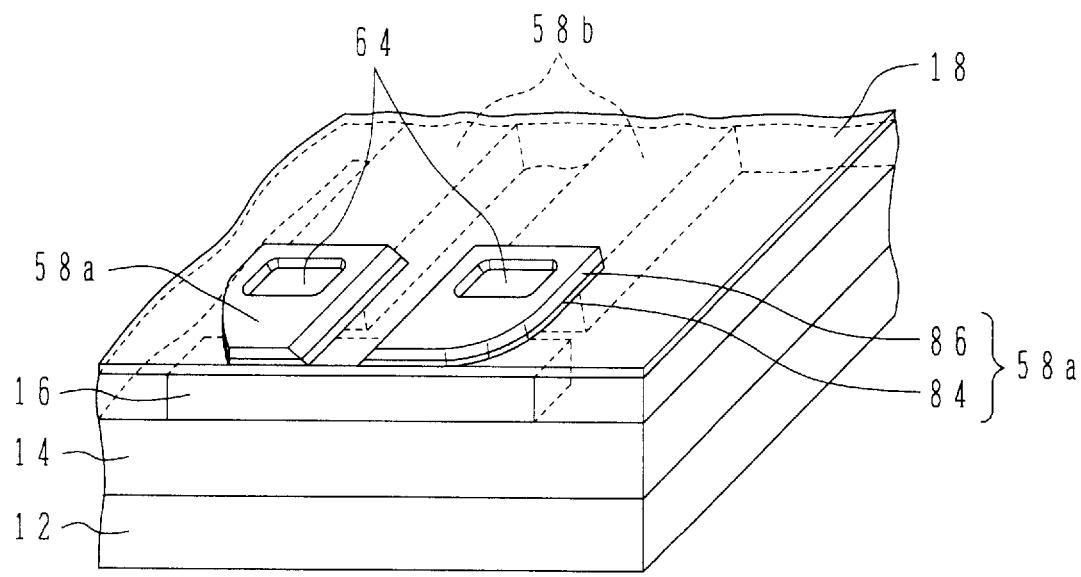

Referring to FIG. 10, a magnet film (e.g., Co-containing alloy) 84, an anticorrosion metal film (e.g., Ta) 86, and the like are deposited on the whole surface of the substrate with a collective thickness of 50 to several hundreds nm. A resist frame is formed by photolithography on the area where a thin lead portion 58a is formed. Thereafter, the whole surface of the substrate is etched by ion milling or the like to etch the magnet film 84, anticorrosion metal film 86, and the like at the area where the resist frame is not formed, and then the resist frame is removed. In this manner, the thin lead portions 58a are formed. With this ion milling, the confronting surfaces of the thin lead portions 58a at the inner areas in the width direction become slanted surfaces.

Figure 11:
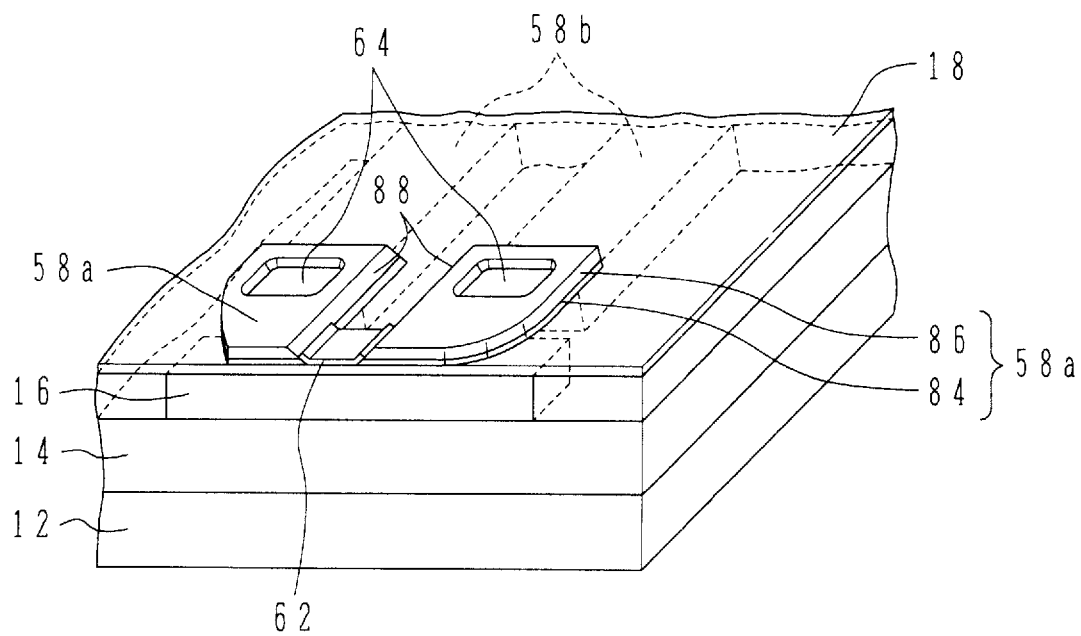

Referring to FIG. 11, an MR element film is formed on the whole surface of the substrate by depositing an MR film, a spacer, and a transverse bias film in this order by vapor deposition or sputtering. For example, an MR film is made of NiFe alloy deposited 10 to 30 nm, a spacer is made of Ti deposited 5 to 15 nm, and a traverse bias film is made of CoZrM (M is Nb, Mo, or the like) deposited 5 to 25 nm. The MR element film is therefore 20 to 70 nm thick in total.

A photoresist frame is formed by photolithography on the area where an MR element 62 is formed, the whole surface of the substrate is etched by ion milling or the like to etch the MR element film at the area where the resist frame is not formed. Thereafter, the resist frame is removed. The final MR element 62 is in the state that it is connected between the right and left thin lead portions 58a. The confronting surfaces 88 of the thin lead portions 58a are slanted. At these slanted surfaces 88, the right and left terminals of the MR element 62 are magnetically connected to the thin lead portions 58a.

Figure 12:
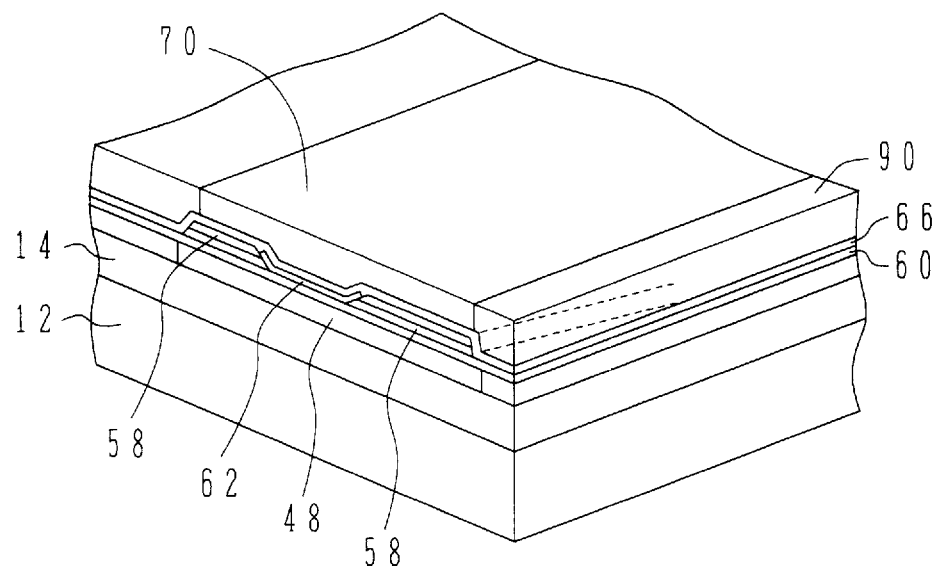

Referring to FIG. 12, an upper reproduction gap layer 66 is formed by depositing non-magnetic insulating material such as $Al_2O_3$ by sputtering or the like over the whole surface of the substrate to a thickness of several tens to 100 nm. Since the thick lead portions 58b are covered with the flat lower reproduction gap layer 60, the upper reproduction gap layer 66 formed on the lower reproduction gap layer 60 is also flat in the area corresponding to the thick lead portions 58b. On the upper reproduction gap layer 66, an upper magnetic shield layer and lower core layer 70 is deposited to a thickness of 2 to 4.5 μm in the similar manner to the lower magnetic shield layer. Since the upper and lower reproduction gap layers 60 and 66 are formed flat in the area corresponding to the thick lead portions 58b, good insulation between the upper magnetic shield layer 70 and the thick lead portions 58b can be maintained. Non-magnetic insulating material 90 such as $Al_2O_3$ is filled in the side areas of the upper magnetic shield layer and lower core layer 70, and if necessary, the whole substrate surface is lapped to provide a flat surface.

Figure 13:
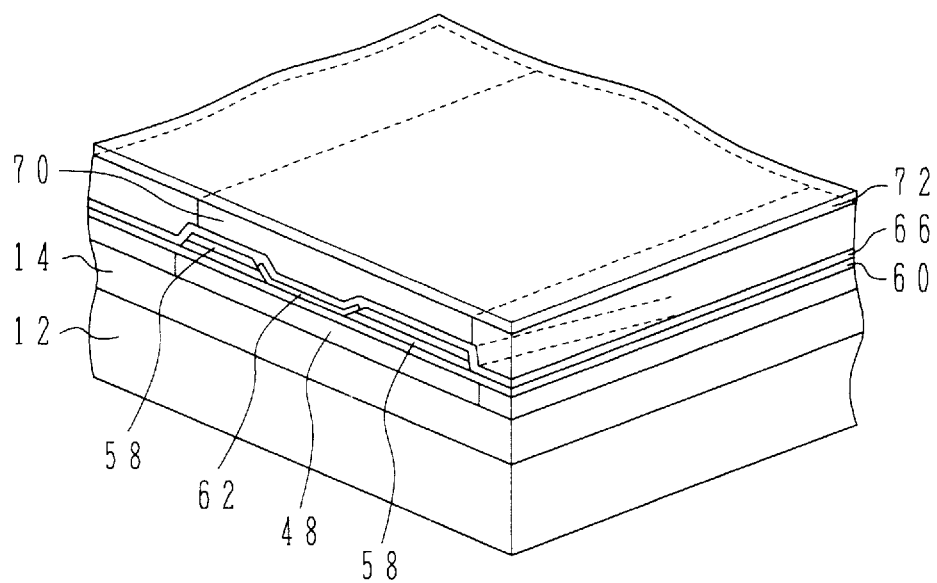

As shown in FIG. 13, non-magnetic insulating material such as $Al_2O_3$ is deposited by sputtering or the like over the whole substrate surface to several hundreds nm to thereby form a write gap layer 72.

Figure 14:
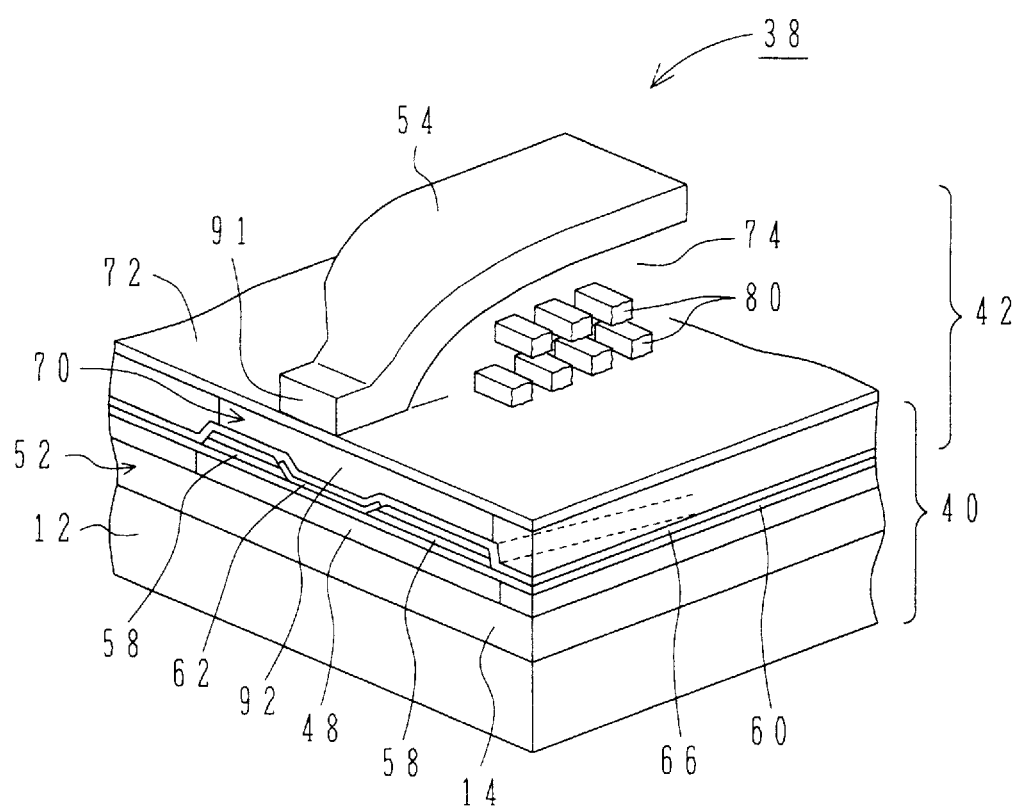

As shown in FIG. 14, on the write gap layer 72, a coil 80, an insulating layer 74, and an upper core 54 are formed by manufacture processes similar to general induction type thin film magnetic heads. Lastly, a protective film of non-magnetic insulating material such as $Al_2O_3$ is formed on the whole substrate surface to complete the composite magnetic head.

The upper pole 91 is the front end portion of the upper core, and the lower pole 92 is the front end portion of the lower core 70. The end surfaces of the upper and lower poles 91 and 92 constitute part of the recording medium facing surface 52.

Figure 2:
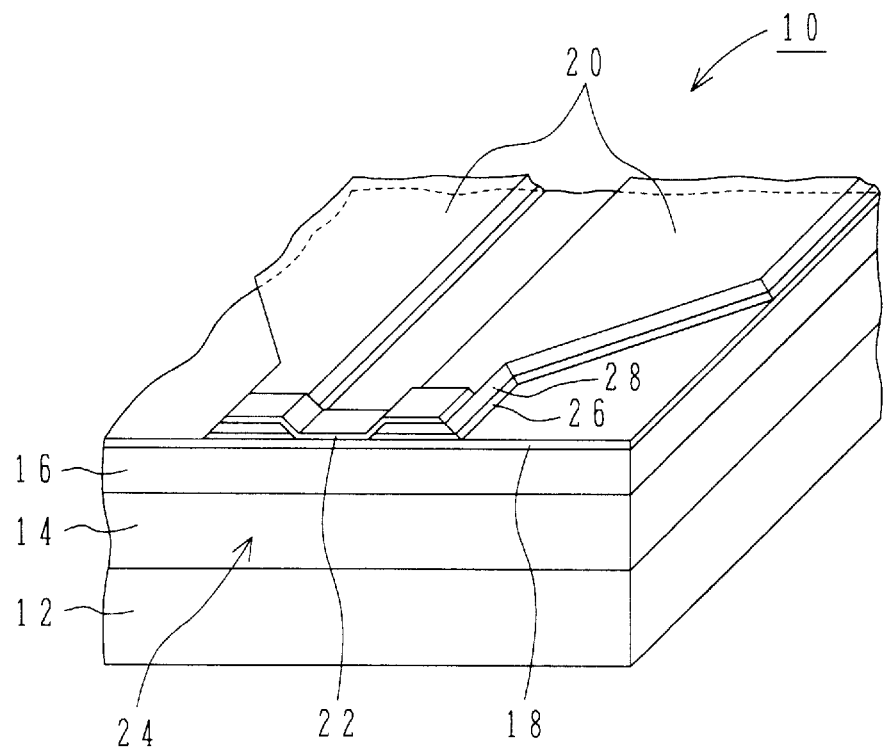
FIG. 2 is a perspective view of a conventional MR type magnetic head.
Figure 3:
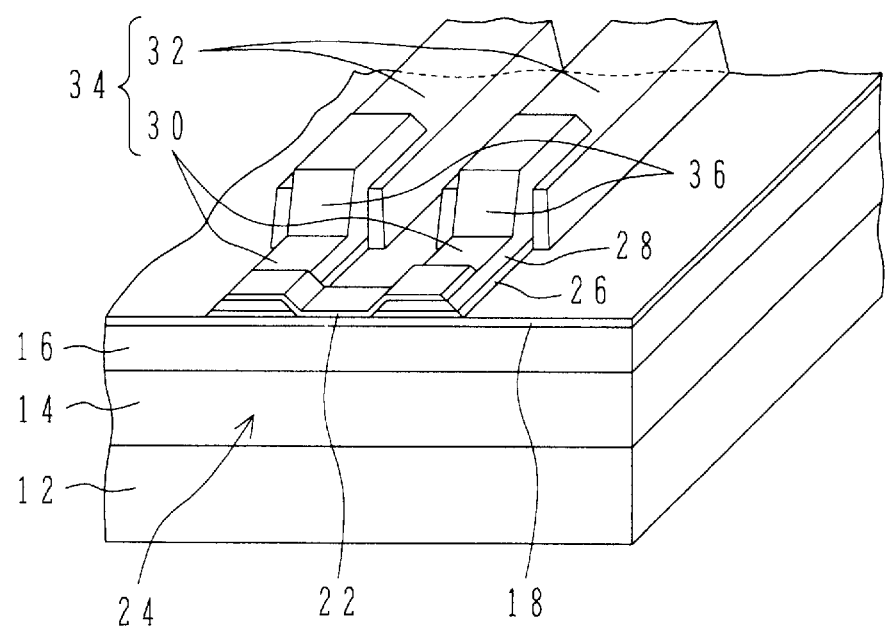
FIG. 3 is a perspective view of a conventional MR type magnetic head with reduced electrical resistance of leads.

The MR type magnetic head 40 of the induction type and MR type thin film magnetic head 38 of this embodiment was compared to the conventional MR type magnetic head 10 shown in FIG. 2. The resistance of the leads 20 exclusive of the MR element 22 of the conventional MR type magnetic head 10 was difficult to lower to 7 Ω even if the lead was formed to have a maximum width allowed by a head slider. The lead 20 made of Ta and formed 300 nm thick was 8 to 10 Ω.

In contrast, the resistance of the leads 58 exclusive of the MR element 62 of the MR type magnetic head 40 shown in FIG. 14 was 2 Ω or smaller, under the conditions that the length (distance between the contact point to the thick lead portion 58b and a contact point to the MR element 62) of the thin lead portion 58a was 15 μm and the thickness of the thin lead portion 58a made of Ta was 250 nm. The total resistance of the leads 58 was able to lower because of the provision of the thick lead portion 58b having a low resistance and the shortened thin lead portion of Ta having a high resistance. In addition, the electrical insulation characteristics between the lead 20 and upper magnetic shield layer 70 as well as product yield were improved. Since heat generation is proportional to a resistance value under the same sense current, heat generation of the MR type magnetic head 40 shown in FIG. 14 was reduced to one third to one fourth that of the MR type magnetic head 10 shown in FIG. 2. With this reduced heat generation, an increase in resistance caused by electromigration at a constant sense current (20 mA) and at a high temperature (90° C.) was suppressed to 5% or smaller (during 24 hours) and the reliability of the MR type magnetic head was improved.

In the process illustrated in FIG. 5, the thick lead portions 58b and lower shield 48 are made of the same material. These may be made of different materials. In this case, for example, a photoresist frame is formed on the underlying metal layer formed on the non-magnetic insulating film 46, at the area other than the area where the thick lead portions 58b are formed. The thick lead portions 58b are formed by electrically plating metal having a high conductivity such as Cu, and thereafter the photoresist film is removed. Next, a photoresist frame is formed at the area other than the area where the lower magnetic shield layer 48 is formed. The lower magnetic shield layer 48 is formed by electrically plating magnetic material such as NiFe alloy, and thereafter the photoresist film is removed. The lower magnetic shield layer 48 may be formed first and then the thick lead portions 58b are formed.

The present invention has been described in connection with the preferred embodiments. The invention is not limited only to the above embodiments. It is apparent that various modifications, improvements, combinations, and the like can be made by those skilled in the art.

We claim:

1. A method of fabricating a magnetic head comprising the steps of:

a) providing a substrate having a first magnetic shield layer having a first length from an edge of the substrate adapted to face against a magnetic medium along a depth direction of the magnetic head;

b) forming a first lead portion having a first thickness and a first resistivity on the substrate, wherein the first lead portion is located at a back side of the first magnetic shield layer along the depth direction with respect to the magnetic medium, and the first lead portion and the first magnetic shield layer are coplanar;

c) forming a first gap layer over the first magnetic shield layer and the first lead portion;

d) forming a contact hole through the first gap layer so as to expose a part of the first lead portion;

e) forming a second lead portion having a second thickness and a second resistivity on the first gap layer, located at a front side along the depth direction with respect to the magnetic medium, starting from a position above the edge, and contacting the first lead portion through the contact hole; and f) forming a magnetoresistive material layer over the second lead portion.

2. A method according to claim 1, further comprising the steps of:

g) forming a second magnetic shield layer over the first gap layer, the second lead portion and the magnetoresistive material layer;

h) forming a second gap layer over the second magnetic shield layer;

i) forming coil structures over the second gap layer; and j) forming a magnetic layer over the coil structures.

3. A method according to claim 1, wherein the magnetoresistive material layer has a second length along the depth direction and the first length of the first magnetic shield layer is 5 to 30 times larger than the second length.

4. A method according to claim 1, wherein the second thickness of the second lead portion is smaller than the first thickness of the first lead portion.

5. A method according to claim 1, wherein the first lead portion comprises a material selected from a group consisting of copper and Ni—Fe alloy.

6. A method according to claim 1, wherein the step e) comprises the steps of:

e-1) forming a magnetic film on the first gap layer; and e-2) forming a conductive material film on the magnetic film.

7. A method according to claim 6, wherein the conductive material layer is made of Ta.

8. A method according to claim 6, further comprising the steps of:

e-3) forming a mask for patterning a lamination of the magnetic film and the conductive material film; and e-4) removing the lamination of the magnetic film and the conductive material film so as to provide separated lead structures, wherein the separated lead structures have opposing slanted surfaces.

9. A method according to claim 1, wherein the second thickness of the second lead portion is thinner than the first thickness and the second resistivity of the second lead portion is larger than the first resistivity of the first lead portion.

10. A method of fabricating a magnetic head comprising the steps of:

a) providing a first magnetic shield layer having a first length along a depth direction of the magnetic head and a first lead having a first thickness and a first resistivity, which is coplanar to the first magnetic shield layer, the first lead portion being offset toward a back side along the depth direction with respect to a magnetic medium;

b) forming a flat first gap layer over the first magnetic shield layer and the first lead portion;

c) forming a contact hole through the first gap layer so as to expose the first lead portion;

d) forming a second lead portion having a second thickness which is thinner than the first thickness and a second resistivity which is larger than the first resistivity of the first lead portion, wherein the second lead portion is located at a front side along the depth direction with respect to the magnetic medium and contacted the first lead portion through the contact hole; and e) forming a magnetoresistive material layer over the second lead portion.

11. A method according to claim 10, wherein the first gap layer includes a non-magnetic insulating material layer, the first magnetic shield layer and the first lead portion being embedded in the non-magnetic insulating material layer and top surfaces of the first magnetic shield layer, the first lead portion and the non-magnetic insulating material layer being coplanar.

12. A method according to claim 10, wherein the magnetoresistive material layer has a second length along the depth direction and the first length of the first magnetic shield layer is 5 to 30 times larger than the second length.

13. A method according to claim 10, wherein the second thickness of the second lead portion is smaller than the first thickness of the first lead portion.

14. A method according to claim 10, wherein the first lead portion and the first magnetic shield layer are formed simultaneously.

15. A method according to claim 10, wherein the step d) comprises the steps of:

d-1) forming a magnetic film on the first gap layer; and d-2) forming a conductive material film on the magnetic film.

16. A method according to claim 15, wherein the conductive material layer is made of Ta.

17. A method according to claim 15, further comprising the steps of:

d-3) forming a mask for patterning a lamination of the magnetic film and the conductive material film; and d-4) removing the lamination of the magnetic film and the conductive material film so as to provide separated lead structures, wherein the separated lead structures have opposing slanted surfaces.

* * * * *